United States Patent [19]

Sato et al.

[11] Patent Number: 5,530,237
[45] Date of Patent: Jun. 25, 1996

[54] APPARATUS FOR FOCUSING ON TRANSPARENT OBJECTS

[75] Inventors: Manabu Sato, Yokosuka; Jun Matsuno, Zushi, both of Japan

[73] Assignee: Nikon Corporation, Tokyo, Japan

[21] Appl. No.: 299,444

[22] Filed: Sep. 1, 1994

[30] Foreign Application Priority Data

Sep. 2, 1993 [JP] Japan .................. 5-218898

[51] Int. Cl.$^6$ .................................. G02B 7/04
[52] U.S. Cl. ............... 250/201.4; 250/559.28; 356/381; 359/383
[58] Field of Search ............... 250/201.3, 201.4, 250/208.1, 571, 559, 560, 561, 559.27, 559.28, 559.29; 356/373, 375, 381; 355/55; 359/383

[56] References Cited

U.S. PATENT DOCUMENTS

| | | | |
|---|---|---|---|
| 3,721,827 | 3/1973 | Reinheimer | 250/201.3 |
| 4,512,642 | 4/1985 | Ito et al. | 354/4 |
| 4,620,089 | 10/1986 | Schlichting et al. | 250/201.4 |
| 4,625,103 | 11/1986 | Kitamura et al. | 250/201.4 |
| 4,958,920 | 9/1990 | Jorgens et al. | 350/530 |
| 5,268,744 | 12/1993 | Mori et al. | 356/400 |
| 5,317,142 | 5/1994 | Noda et al. | 250/201.4 |

*Primary Examiner*—Edward P. Westin
*Assistant Examiner*—Stephen Calogero

[57] ABSTRACT

In a focusing apparatus, a beam of light from a light beam source is imaged on an object to be inspected through one half of the pupil of an imaging optical system and a reflected beam of light from the object to be inspected passes through the other half of the pupil. The object to be inspected and the imaging optical system are moved relative to each other to effect focusing. A light divider divides the reflected beam of light from the object to be inspected into first and second reflected beams of light which are received by first and second light receiving members, respectively. A light intercepting member intercepts the reflected beam of light from the back of the object to be inspected, which is included in the second reflected beam of light. A controller moves the object to be inspected and the imaging optical system relative to each other on the basis of the outputs of the first and second light receiving members. The controller moves the object to be inspected and the imaging optical system relative to each other on the basis of the output of the first light receiving member, and thereafter moves the object to be inspected and the imaging optical system relative to each other on the basis of the output of the second light receiving member to effect focusing.

17 Claims, 10 Drawing Sheets

APPARATUS FOR FOCUSING ON TRANSPARENT OBJECTS

BACKGROUND OF THE INVENTION

1. Field of the Invention

This invention relates to a focusing apparatus for bringing an imaging optical system and a surface to be inspected into an in-focus state, and is suitable for use in a microscope.

2. Related Background Art

A focusing apparatus for use in a microscope of the episcopic-illumination type is disclosed, for example, in U.S. Pat. No. 3,721,827.

This apparatus, as shown in FIG. 11 of the accompanying drawings, has a slit light source comprising a light source 101 for measurement, a condensing lens 102 and a slit plate 103. Of the optical paths of light beams from the slit plate 103, one optical path 111 bisected by a plane containing the optical axis of the condensing lens 102, is intercepted by a light intercepting plate 104. Of the light beams from the slit plate, a light beam passed through the other optical path 112 is reflected by a half mirror 105, passes through an optical path 113 at the left of the optical axis of an objective lens 106 to the objective lens 106, and is imaged on a surface 107 to be inspected. The reflected beam of light from the surface 107 to be inspected passes through an optical path 114 at the right of the optical axis and through the objective lens 106, and is re-imaged on the light receiving surface of a light receiving element 108. The light receiving surface of the light receiving element 108 is bisected by the optical axis of the objective lens 106, and outputs are obtained from two light receiving areas 108a and 108b, respectively.

When the positional relation between the objective lens 106 and the surface 107 to be inspected is in an in-focus state, the reflected beam of light from the surface 107 to be inspected is re-imaged on the boundary line between the light receiving area 108a and the light receiving area 108b. When the positional relation between the objective lens 106 and the surface 107 to be inspected is farther than the in-focus state, the reflected beam of light from the surface 107 to be inspected is re-imaged on this side of the light receiving surface of the light receiving element 108 (front focus state) and enters the light receiving area 108a. When the positional relation between the objective lens 106 and the surface 107 to be inspected is closer than the in-focus state (rear focus state), the re-imaged position of the reflected beam of light from the surface 107 to be inspected is rearward of the light receiving element 108, and on the light receiving surface, the reflected beam of light enters the light receiving area 108b.

It is possible to judge that the focus state is the front focus state when the differential signal between the outputs of the light receiving area 108a and the light receiving area 108b is positive, that the focus state is the rear focus state when said differential signal is negative and that the focus state is the in-focus state when the differential signal is zero. It is possible to judge the position of the surface to be inspected from this differential signal and to automatically effect alignment.

In recent years, due to the spread of liquid crystal displays, etc., the inspection of a liquid crystal pattern formed on a transparent substrate such as glass is becoming an important industrial task, and it is popular to use a microscope for such inspection.

However, when the inspection of a transparent substrate like a liquid crystal substrate is effected by the use of the apparatus as shown in FIG. 11, an accurate in-focus state is not obtained. That is, glass is a substance of low reflectance and the intensity of the reflected beam of light from the surface of an object to be inspected and the intensity of the reflected beam of light from the back of the object to be inspected become nearly equal to each other. When the positional relation between the objective lens and the surface of the object to be inspected is in the in-focus state, the re-imaged position of the reflected beam of light from the surface of the object to be inspected is on the light receiving surface of the light receiving element. However, the reflected beam of light from the back of the object to be inspected is re-imaged on this side of the light receiving surface of the light receiving element and enters the light receiving area 108a on the light receiving surface. Therefore, in spite of being focused on the surface to be inspected, a differential signal representative of the not in-focus state is outputted from the light receiving element, and the focusing apparatus determines that the focus state is not the in-focus state.

SUMMARY OF THE INVENTION

The present invention has as its object the provision of a focusing apparatus for accurately detecting the position of a surface (a surface to be inspected) and effecting focusing even when an object to be inspected like a transparent substrate such as glass in which a reflected beam of light of the same degree as a reflected beam of light from the surface (the surface to be inspected) is created from another part (e.g. the back) of the object is to be inspected.

In order to achieve the above object, the present invention provides, in a focusing apparatus wherein a beam of light from a light source is passed through one half of the pupil of an imaging optical system and is imaged on an object to be inspected and said object to be inspected and said imaging optical system are moved relative to each other on the basis of the reflected beam of light from said object to be inspected passing through the other half of the pupil of said imaging optical system to thereby effect focusing, light dividing means for dividing the reflected beam of light from the object to be inspected into a first reflected beam of light and a second reflected beam of light, and the first reflected beam of light is received by a first light receiving member and the second reflected beam of light is received by a second light receiving member. A light intercepting member for intercepting the reflected beam of light from the back of the object to be inspected included in the second reflected beam of light is installed between the light dividing means and the second light receiving member. As control means for focusing, provision is made of control means for moving the surface to be inspected and the imaging optical system relative to each other on the basis of the output of the first light receiving member and the output of the second light receiving member.

It is preferable for said control means to move the object to be inspected and the imaging optical system relative to each other on the basis of the output of the first light receiving member, and thereafter move the object to be inspected and the imaging optical system relative to each other on the basis of the output of the second light receiving member to thereby effect focusing.

It is preferable that said light intercepting member be disposed between a plane optically conjugate with the surface of the object to be inspected and a plane optically conjugate with the back of the object to be inspected, with respect to the imaging optical system.

According to the above-described construction, of the reflected beam of light from the object to be inspected which travels toward the second light receiving member, the reflected beam of light from the back of the object to be inspected is intercepted by the light intercepting member and the reflected beam of light from the surface of the object to be inspected is not intercepted by the light intercepting member and enters the second light receiving member and therefore, if the relative position of the imaging optical system and the surface to be inspected is controlled on the basis of the output of the second light receiving member, accurate focusing could be effected without being affected by the reflected beam of light from the back of the object to be inspected.

Also, according to the above-described construction, even when the reflected beam of light from the object to be inspected is intercepted by the light intercepting member and an output for focusing is not obtained from the second light receiving member, the relative position of the object to be inspected and the imaging optical system is controlled on the basis of the output of the first light receiving member, whereafter the relative position of the object to be inspected and the imaging optical system is controlled on the basis of the output of the second light receiving member and therefore, in whatever state may be the relative positional relation between the object to be inspected and the imaging optical system, an output for focusing can be obtained from the light receiving member and focusing can be effected accurately.

Also, as the specific position of the light intercepting member, it is appropriate to install it between a plane optically conjugate with the surface of the object to be inspected and a plane optically conjugate with the back of the object to be inspected, with respect to the imaging optical system. The reflected beam of light from the back is imaged on the optical axis of the imaging optical system short of the imaged position of the reflected beam of light from the surface, and describes an optical path point-symmetrical with the optical path to the imaged position with the imaging point as the focus. By the light intercepting member being installed on this optical path, the light intercepting member can intercept only the reflected beam of light from the back of the object to be inspected and can pass therethrough the reflected beam of light from the surface of the object to be inspected which is the surface to be inspected.

DESCRIPTION OF THE PREFERRED EMBODIMENTS

Figure 1:
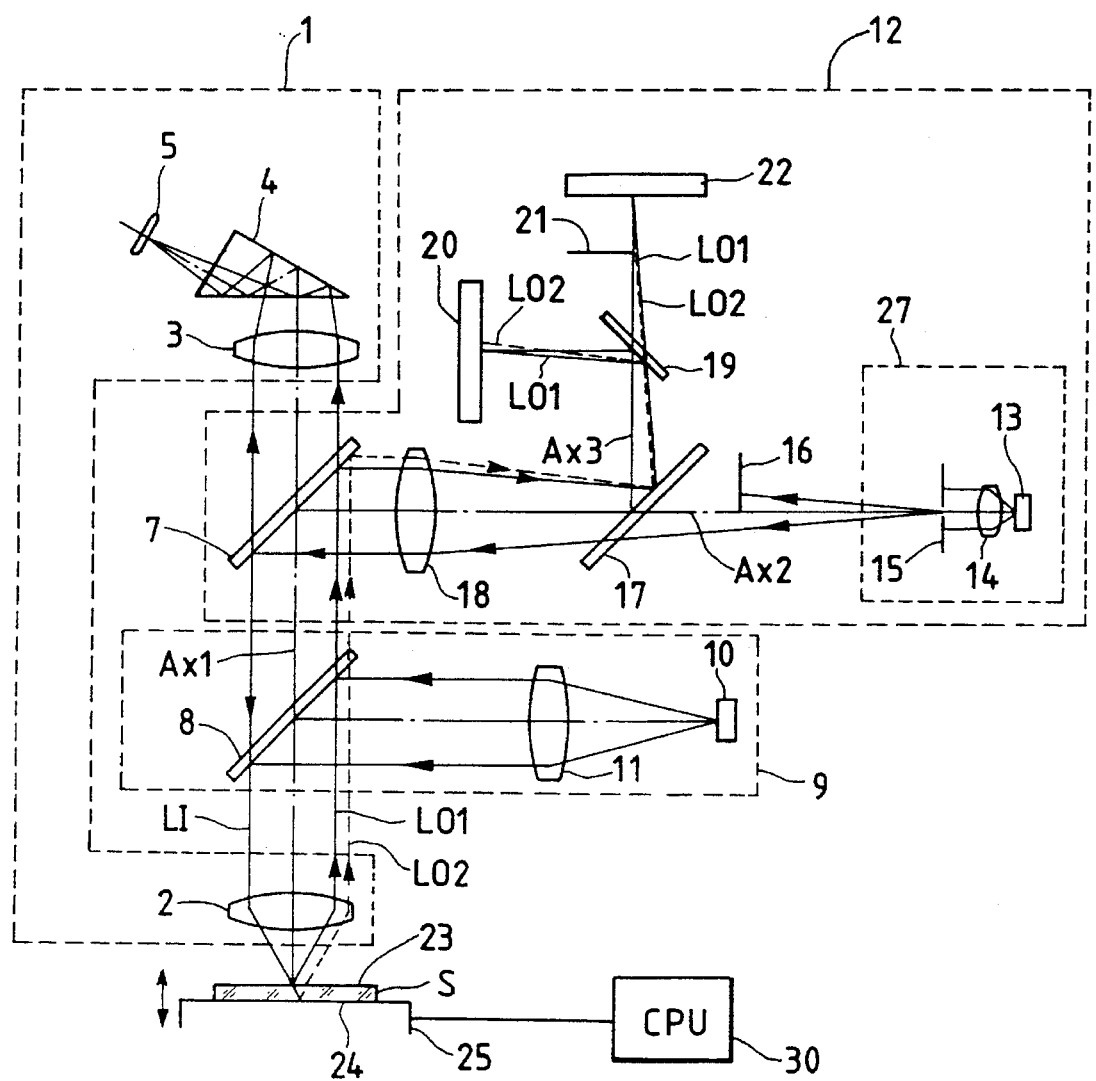
FIG. 1 is an optical construction diagram according to a preferred embodiment of the present invention.

FIG. 1 shows the optical construction of a microscope according to a preferred embodiment of the present invention. The microscope of FIG. 1 is comprised of an observation optical system 1, an illuminating optical system 9 and a focusing detection system 12. The detailed description of the observation optical system 1 and the illuminating optical system 9 is omitted herein.

The observation optical system 1 has a first objective lens 2, a second objective lens 3, a prism 4 and an eyepiece 5. A parallel optical path is formed between the first objective lens 2 and the second objective lens 3.

The illuminating optical system 9 has an illuminating light source 10 emitting visible light, a condensing lens 11 and a half mirror 8. The half mirror 8 is installed in the parallel optical path between the first objective lens 2 and the second objective lens 3 at an angle of 45° with respect to the optical axis. A beam of illuminating light emitted from the illuminating light source 10 is directed through the condensing lens 11 and half mirror 8 to the parallel optical path between the first objective lens 2 and the second objective lens 3, and is applied to an object S to be inspected placed on a stage 25 by the first objective lens 2.

The focusing detection system 12 includes a slit light source 27 having an LED 13 emitting infrared light, a condensing lens 14 and a slit plate 15, a field lens 18, a dichroic mirror 7, a first charge coupled device (CCD) 20, a second charge coupled device (CCD) 22 etc. The lengthwise direction of the slit of the slit plate 15 extends in a direction perpendicular to the plane of the drawing sheet of FIG. 1. A light intercepting plate 16 is installed in the optical path of a slit beam of light emitted from the slit light source 27. The light intercepting plate 16 is installed in such a manner that one end thereof coincides with an optical axis A×2, and intercepts the upper half of the optical path of the slit beam of light emitted from the slit light source 27 which contains the optical axis A×2 and is bounded by a plane perpendicular to the plane of the drawing sheet of FIG. 1. A slit beam of light passed through the lower half of the optical path of the slit beam of light emitted from the slit light source 27 which contains the optical axis A×2 and is bounded by the plane perpendicular to the plane of the drawing sheet of FIG. 1 passes through a half mirror 17 to the field lens 18 and becomes a parallel beam of light. The parallel beam of light having emerged from the field lens 18 enters the dichroic mirror 7. The dichroic mirror 7 is installed in the parallel optical path between the first objective lens 2 and the second objective lens 3 at an angle of 45° with respect to the optical axis, and reflects the parallel beam of light from the field lens 18. The beam of light reflected by the field lens 18 is applied to the object S to be inspected on the stage 25 through the half mirror 8 and the objective lens 2.

The dichroic mirror 7 reflects the reflected beam of infrared light from a specimen S impinging thereon through the objective lens 2 and the half mirror 8 toward the field lens 18. The reflected beam of infrared light reflected by the dichroic mirror 7 enters the half mirror 17 through the field lens 18, and is reflected toward a half mirror 19. The reflected beam of infrared light having entered the half mirror 19 is divided into a beam of light reflected by the half mirror 19 and travelling toward the first CCD 20 and a beam of light transmitted through the half mirror 19 and travelling toward the second CCD 22. A light intercepting plate 21 is installed between the half mirror 19 and the second CCD 22. The light intercepting plate 21 has a side formed perpendicularly to the plane of the drawing sheet of FIG. 1 and is installed in such a manner that the side coincides with an optical axis Ax3. Further, the light intercepting plate 21 is installed in the area on the optical axis Ax3 between two planes including a plane conjugate with the surface of the object S to be inspected and a plane conjugate with the back of the object S to be inspected, with respect to the direction of the optical axis Ax3.

The stage 25 on which the object S to be inspected is placed is movable in the direction of the bilateral arrow in FIG. 1 and is controlled by a central processing unit 30 (hereinafter referred to as the CPU).

Also, the object S to be inspected in the present embodiment is a liquid crystal substrate having a pattern formed on the surface of a transparent glass plate.

Figure 2:
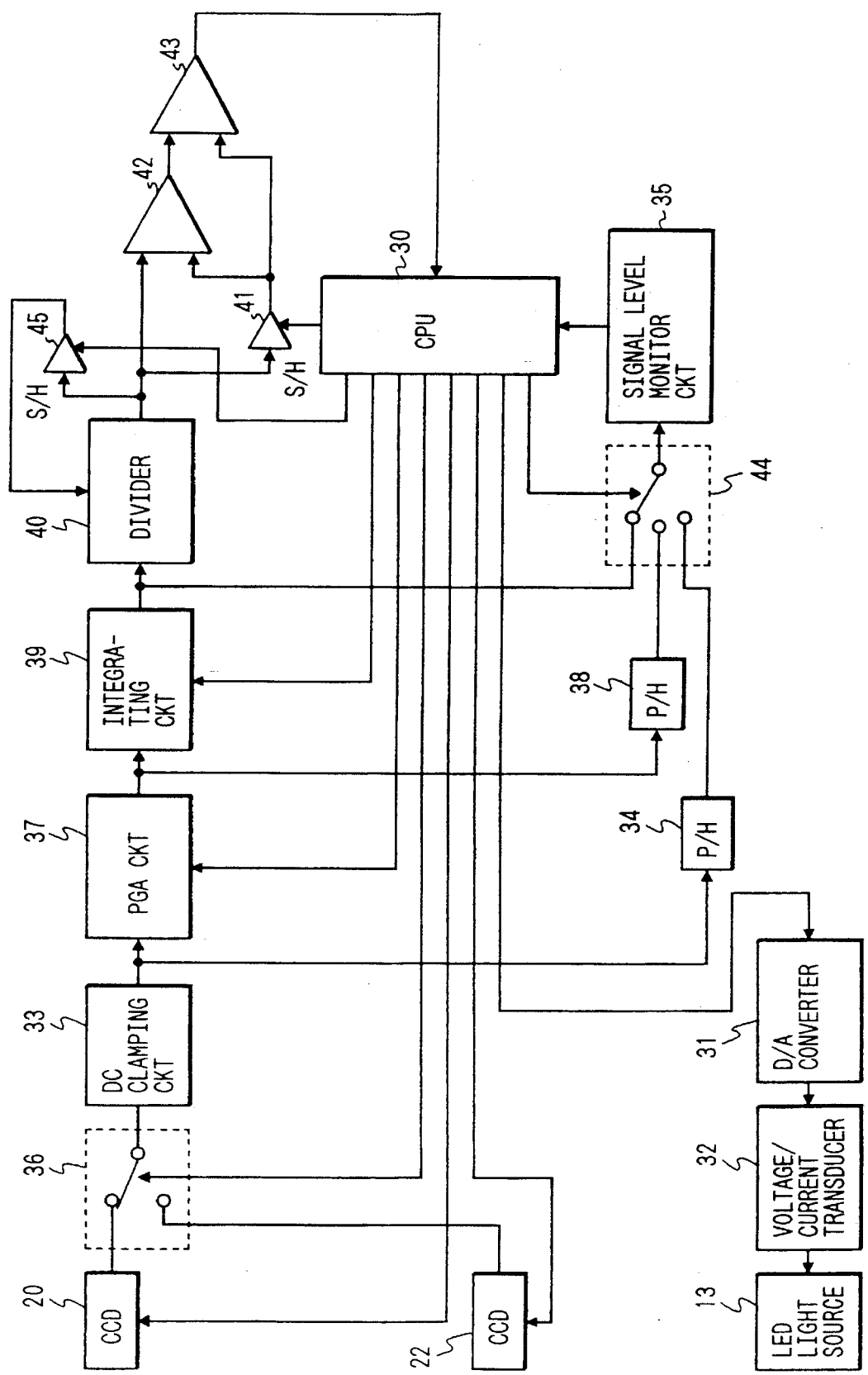
FIG. 2 is a block diagram of the construction of a signal processing circuit according to the preferred embodiment of the present invention.

An electrical signal processing system will now be described with reference to FIG. 2.

The CPU 30 is connected to a D/A converter 31, the first CCD 20, the second CCD 22, a PGA circuit 37, an integrating circuit 39, sampling and holding circuits 41 and 45 and changeover switches 36 and 44.

The D/A converter 31 converts a digital signal inputted from the CPU 30 into an analog signal and outputs it to a voltage current transducer 32. The voltage current transducer 32 supplies an amount of current corresponding to the analog signal from the D/A converter 31 to an LED 13. In response to this current, the LED 13 creates infrared light.

Figure 4:
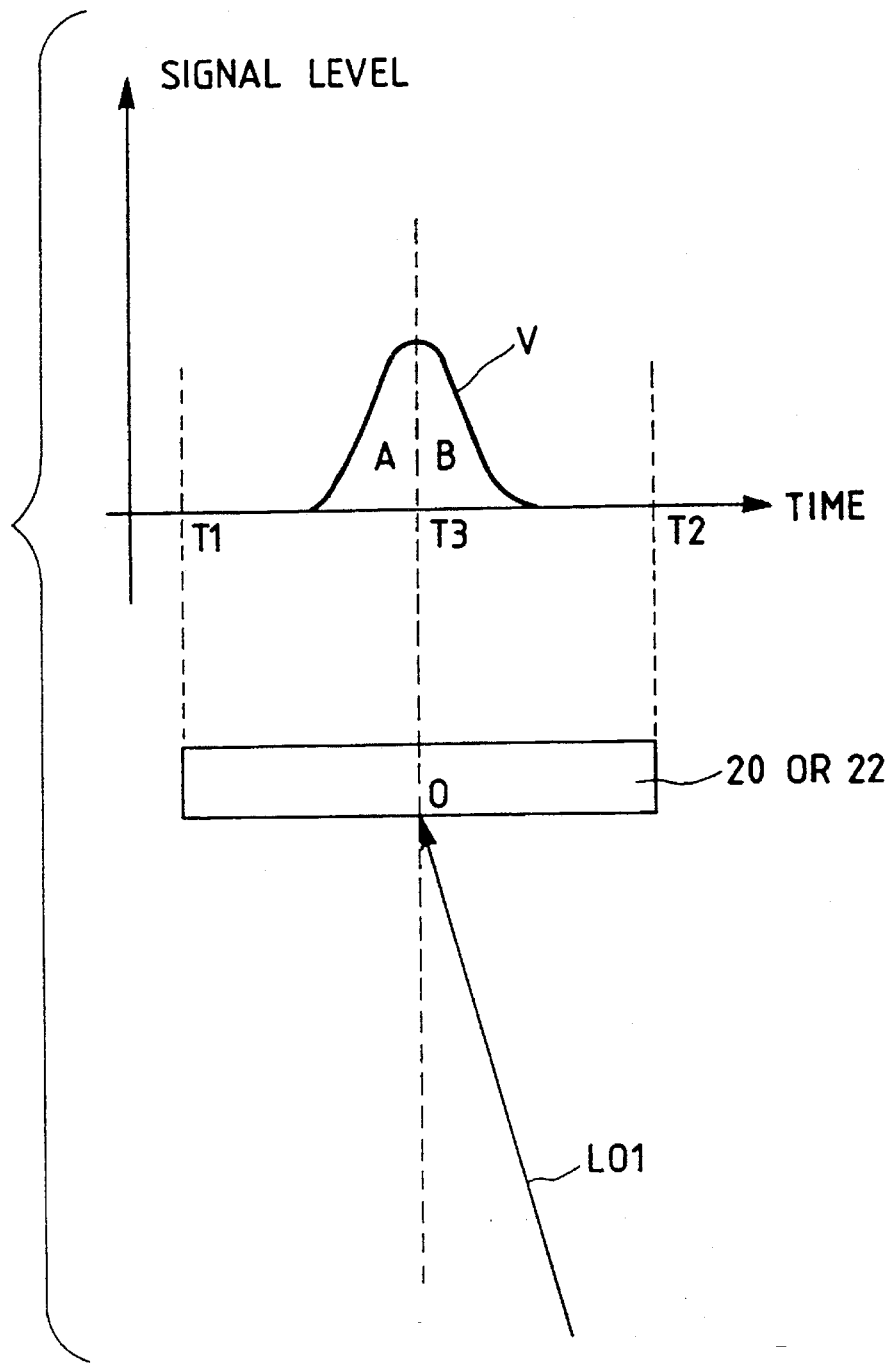
FIG. 4 is a diagram of an example of the relation between the light receiving state of a CCD and an output signal from the CCD.

The first CCD 20 or the second CCD 22, as shown in FIG. 4, outputs a photoelectric signal V corresponding to the quantity of received light from one end to the other end of the light receiving surface during the time from time T1 till time T2.

Also, a case where as shown in FIG. 4, the reflected infrared light L01 from the surface 23 of the object S to be inspected has entered a point 0 on the light receiving surface of the CCD is an in-focus state.

The outputs of the first CCD 20 and the second CCD 22 are inputted to the changeover switch 36. The output of the changeover switch 36 is inputted to a DC clamping circuit 33. The DC clamping circuit 33 cancels the DC offset amount of the output signal of the first CCD 20 or the second CCD 22 and outputs it to a peak holding circuit 34 and a programmable gain amplifier (PGA) circuit 37. The peak holding circuit 34 detects the peak of a signal outputted from the DC clamping circuit 33 and outputs it to the change over switch 44. The PGA circuit 37 effects the pain control of the signal inputted from the DC clamping circuit 33, in accordance with pain data from the CPU 30, and outputs it to a peak holding circuit 38 and the integrating circuit 39. The peak holding circuit 38 detects the peak of a signal inputted from the PGA circuit 37 and outputs it to the changeover switch 44.

The integrating circuit 39 integrates the output of the CCD inputted from the PGA circuit 37 and outputs the integral value to a divider 40 and the changeover switch 44.

Figure 5:
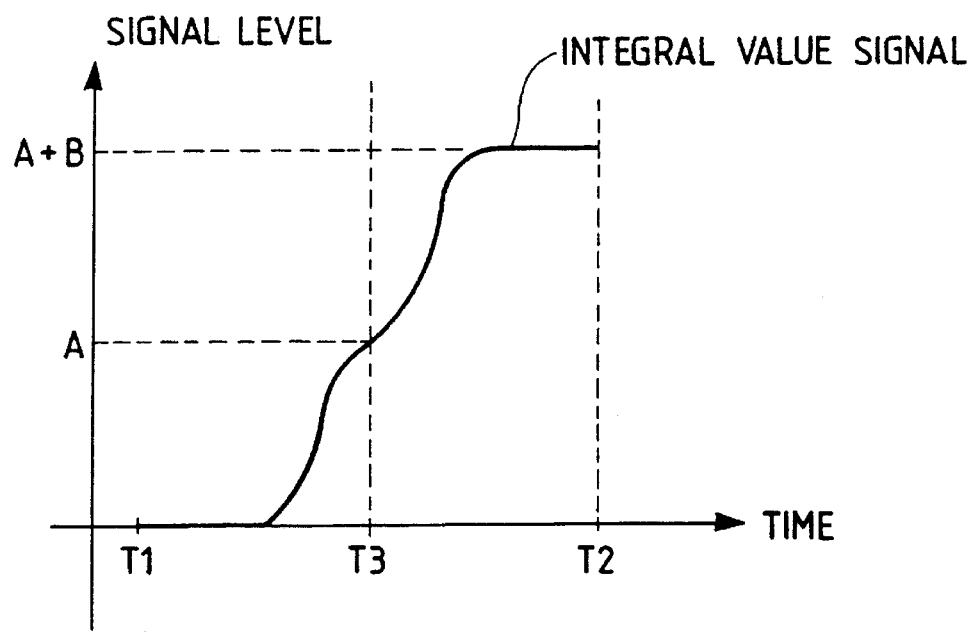
FIG. 5 is a graph of an example of an integral value signal outputted from an integrating circuit.

Assuming that as shown, for example, in FIG. 4, the output signal V of the CCD has been inputted to the integrating circuit 39 during the time from time T1 till time T2, an integral value signal is outputted from the integrating circuit 39 during the time from time T1 till time T2, as shown in FIG. 5.

The signal level A of the integral value signal of FIG. 5 at time T3 corresponds to the area of a portion surrounded by the time axis from time T1 to time T3 and the output signal V in FIG. 4. Also, the signal level (A+B) of the integral value signal of FIG. 5 at time T2 corresponds to the area of a portion surrounded by the time axis and the output signal V in FIG. 4.

Further, assuming that as shown in FIG. 4, there is no reflected light from the back 24 of the object S to be inspected, the integral value A of the output signal V from time T1 till time T3 and the integral value B of the output signal V from time T3 till time T2 become equal to each other because the reflected beam of infrared light L01 from the surface 23 of the object S to be inspected enters the point 0 on the light receiving surface of the CCD.

The divider 40 divides the integral value signal inputted from the sampling and holding circuit 45 and inputted from the integrating circuit 39, and outputs the result of the division to the sampling and holding circuit 45, the sampling and holding circuit 41 and a differential amplifier circuit 42.

The sampling and holding circuit 45 outputs the peak value of the integral value signal outputted from the divider 40 to the divider 40.

Accordingly, a normalized integral value signal which is not affected by a change in the quantity of light of the light source is outputted from the divider 40.

The sampling and holding circuit 41 detects an integral value A at preset time T from the integral value signal inputted from the divider 40 and outputs it to differential amplifier circuits 42 and 43.

The differential amplifier circuit 42 detects an integral value B from the peak value (A+B) of the integral value signal inputted from the divider 40 and the integral value A inputted from the sampling and holding circuit 41 and outputs it to the differential amplifier circuit 43.

The differential amplifier circuit 43 detects the difference (A–B) between the integral value A inputted from the sampling and holding circuit 41 and the integral value B inputted from the differential amplifier circuit 42 and outputs it to the CPU 30.

The CPU 30 judges that the focus state is a front focus state if the signal (A–B) inputted from the differential amplifier circuit 43 is positive, judges that the focus state is a rear focus state if the signal (A–B) is negative, and judges that the focus state is an in-focus state if the signal (A–B) is zero, and outputs a control signal to the stage 25 (see FIG. 1) on the basis of the result of the judgment.

The outputs of the peak holding circuits 34 and 38 are inputted to the changeover switch 44. The output of the changeover switch 44 is inputted to a signal level monitor circuit 35. The signal level monitor circuit 35 detects the peak level of the signals detected by the peak holding circuits 34 and 38 and outputs it to the CPU 30.

Figure 3:
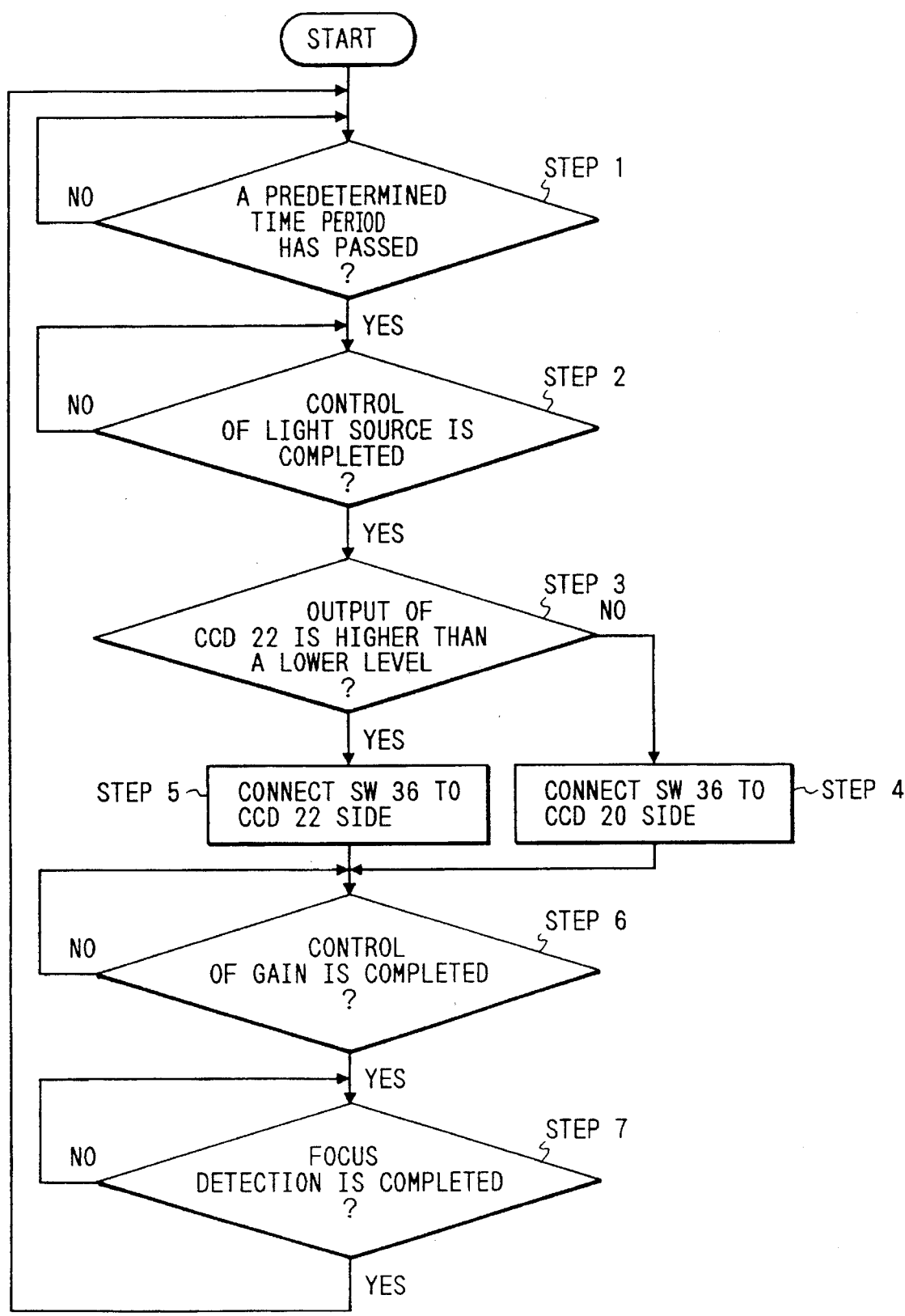
FIG. 3 is a flow chart for the focusing operation in accordance with the preferred embodiment of the present invention.

The operation of the focusing apparatus of the present embodiment constructed as described above will now be described with reference to the flow chart of FIG. 3. The focusing operation shown in the flow chart of FIG. 3 is repetitively performed in synchronism with the output of the CCD.

At the start of the focusing operation, the changeover switch 44 is connected to the peak holding circuit 34. Also, the changeover switch 36 is connected to the first CCD 20.

The CPU 30 outputs predetermined, quantity-of-light data to the D/A converter 31 to adjust the light source. The LED 13 creates infrared light on the basis of the quantity-of-light data outputted from the CPU 30. The infrared light created from the LED 13 is converted into a slit beam of light by the slit plate 15. The slit beam of light passed through the slit plate 15 has its upper half intercepted by the light intercepting plate 16 and has its lower half passed through the half mirror 17 and made into a parallel beam of light by the field lens 18. The parallel beam of light having emerged from the field lens 18 is reflected by the dichroic mirror 7 and is directed to the left half of the parallel optical path between the first objective lens 2 and the second objective lens 3. The parallel beam of light reflected by the dichroic mirror 7 enters the first objective lens 2 and is imaged on the object S to be inspected. The reflected beam of infrared light from the object S to be inspected is directed to the right half of the parallel optical path between the first objective lens 2 and the second objective lens 3, and enters the half mirror 19 via the dichroic mirror 7, the field lens 18 and the half mirror 17. The reflected beam of infrared light is divided into two beams by the half mirror 19, and one beam travels toward the first CCD 20 and the other beam travels toward the second CCD 22.

Upon reception of the reflected infrared light, the first CCD 20 outputs a signal conforming to the quantity of received light. The output signal from the first CCD 20 is inputted to the changeover switch 36, the DC clamping circuit 33, the peak holding circuit 34 and the signal level monitor circuit 35 in succession, and the peak level thereof is outputted to the CPU 30. The CPU 30 judges whether the peak level of this signal is appropriate, and if it is inappropriate, the CPU 30 outputs new quantity-of-light data to the D/A converter 31. This operation is repeated until the output from the first CCD 20 becomes appropriate.

When the adjustment of the light source is completed (step 2), the CPU 30 connects the changeover switch 36 to the second CCD 22. In the same manner as described above, the peak level of the signal outputted from the second CCD 22 is detected by the DC clamping circuit 33, the peak holding circuit 34 and the signal level monitor circuit 35 and is inputted to the CPU 30. The CPU 30 judges whether the peak level inputted from the signal level monitor circuit 35 is higher than a preset lower limit level (step 3).

When it judges that the peak level inputted from the signal level monitor circuit 35 is lower than the preset lower limit level, the CPU 30 regards the signal from the first CCD 20 as effective and connects the changeover switch 36 to the first CCD 20 (step 4).

Figure 6:
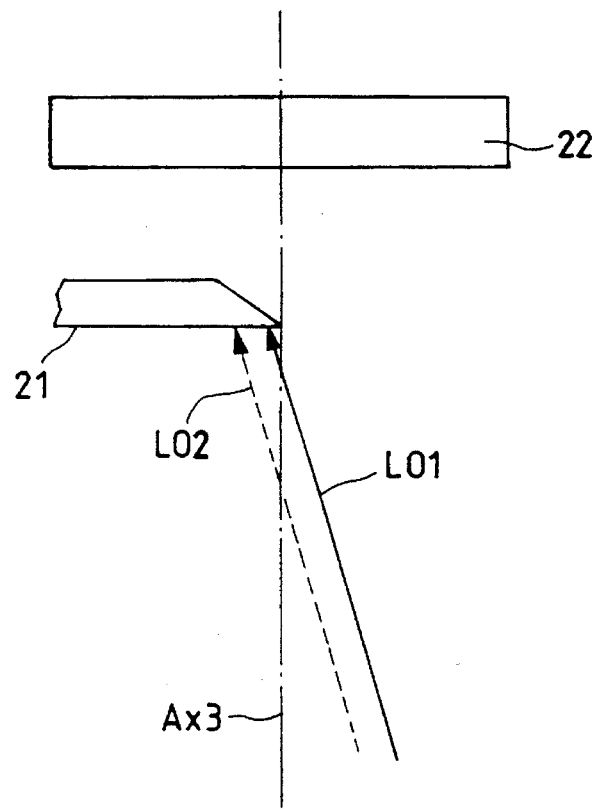
FIG. 6 is a diagram of the light receiving state of a second CCD in a front focus state.

The peak level of the output signal of the second CCD 22 becomes lower than the predetermined lower limit level when as shown, for example, in FIG. 6, the re-imaged positions of the reflected light L01 from the surface 23 of the object S to be inspected and the reflected light L02 from the back of the object S to be inspected are short of the location on the optical axis A×3 at which the light intercepting plate 21 is installed and the reflected beam of infrared light L01 and the reflected beam of infrared light L02 are both intercepted by the light intercepting plate 21.

When the signal outputted from the second CCD 22 is zero or at an extremely low level, in-focus detection cannot be done and therefore, the focusing operation is performed by the first CCD 20.

Subsequently, the CPU 30 connects the changeover switch 44 to the peak holding circuit 38 and also gives any gain data to the PGA circuit 37 in order to effect gain control (step 6).

The output of the first CCD 20 is inputted to the PGA circuit 37 through the changeover switch 36 and the DC clamping circuit 33. The peak holding circuit 38 and the signal level monitor circuit 35 detect the peak level of the signal gain-controlled by the PGA circuit 37 and output it to the CPU 30. The CPU 30 judges whether the peak level inputted from the signal level monitor circuit 35 is appropriate, and if the peak level is inappropriate, the CPU 30 outputs new gain data to the PGA circuit 37. This operation is repeated until the peak level inputted from the signal level monitor circuit 35 becomes appropriate (step 6).

When as described above, the peak level of the output signal from the second CCD 22 is lower than the predetermined lower limit level, the focusing operation is first performed by the signal from the first CCD 20.

Figure 7:
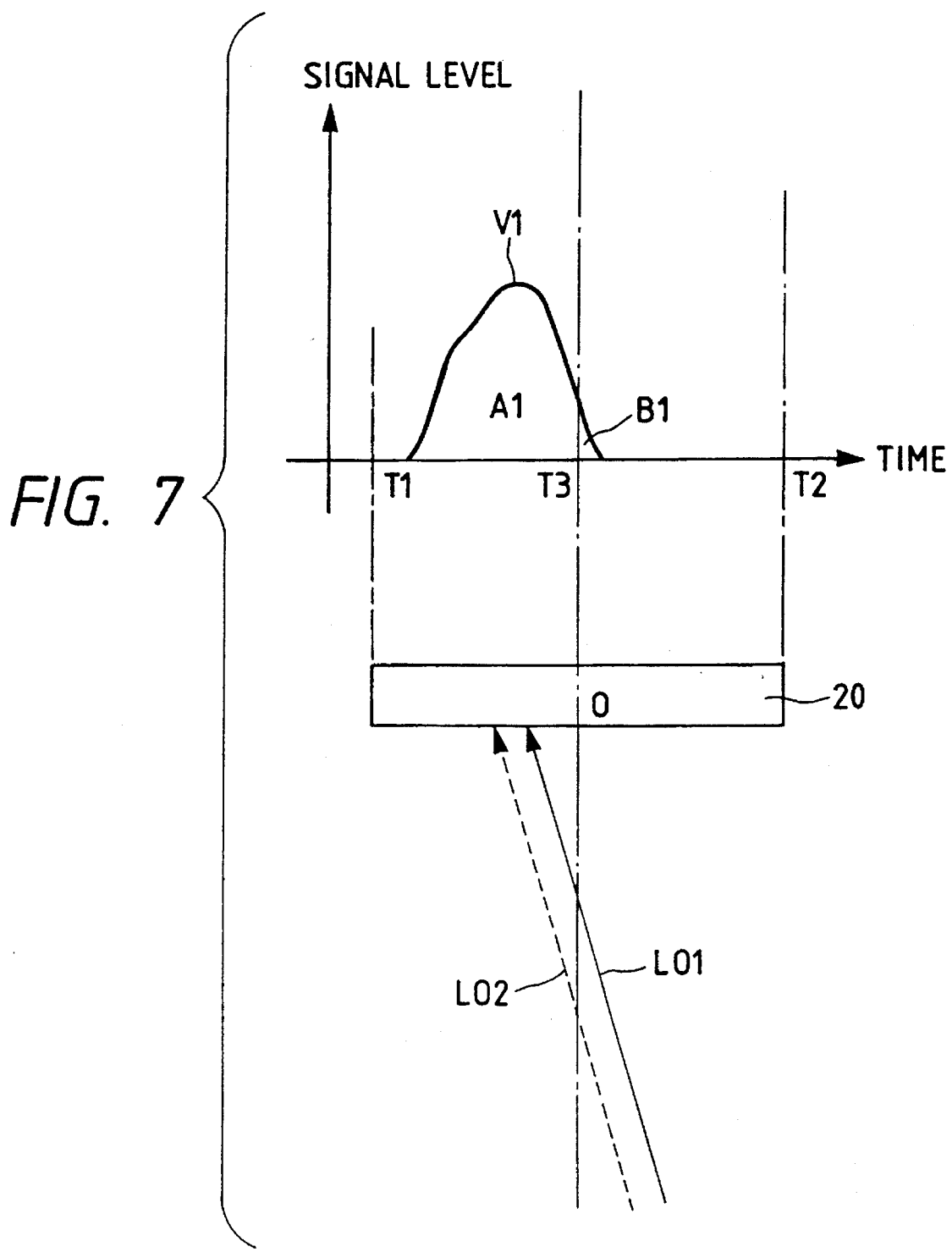
FIG. 7 is a diagram of the light receiving state of a first CCD in the front focus state and the state of a signal outputted from the first CCD.

Since the reflected beams of infrared light L01 and L02 enter the first CCD 20 as shown in FIG. 7, an output signal V1 is put out from the first CCD 20 and the integral value A1 of the output signal V1 from time T1 till time T3 is put out from the sampling and holding circuit 41, and the integral value B1 of the output signal V1 from time T3 till time T2 is put out from the differential amplifier circuit 42. A signal (A1–B1) is outputted from the differential amplifier circuit 43 to the CPU 30.

The CPU 30 elevates the stage 25 so that the output from the differential amplifier circuit 43 may become substantially zero, and brings the surface 23 of the object S to be inspected close to the objective lens 2. This operation is repeated until the output from the differential amplifier circuit 43 becomes zero.

Figure 8:
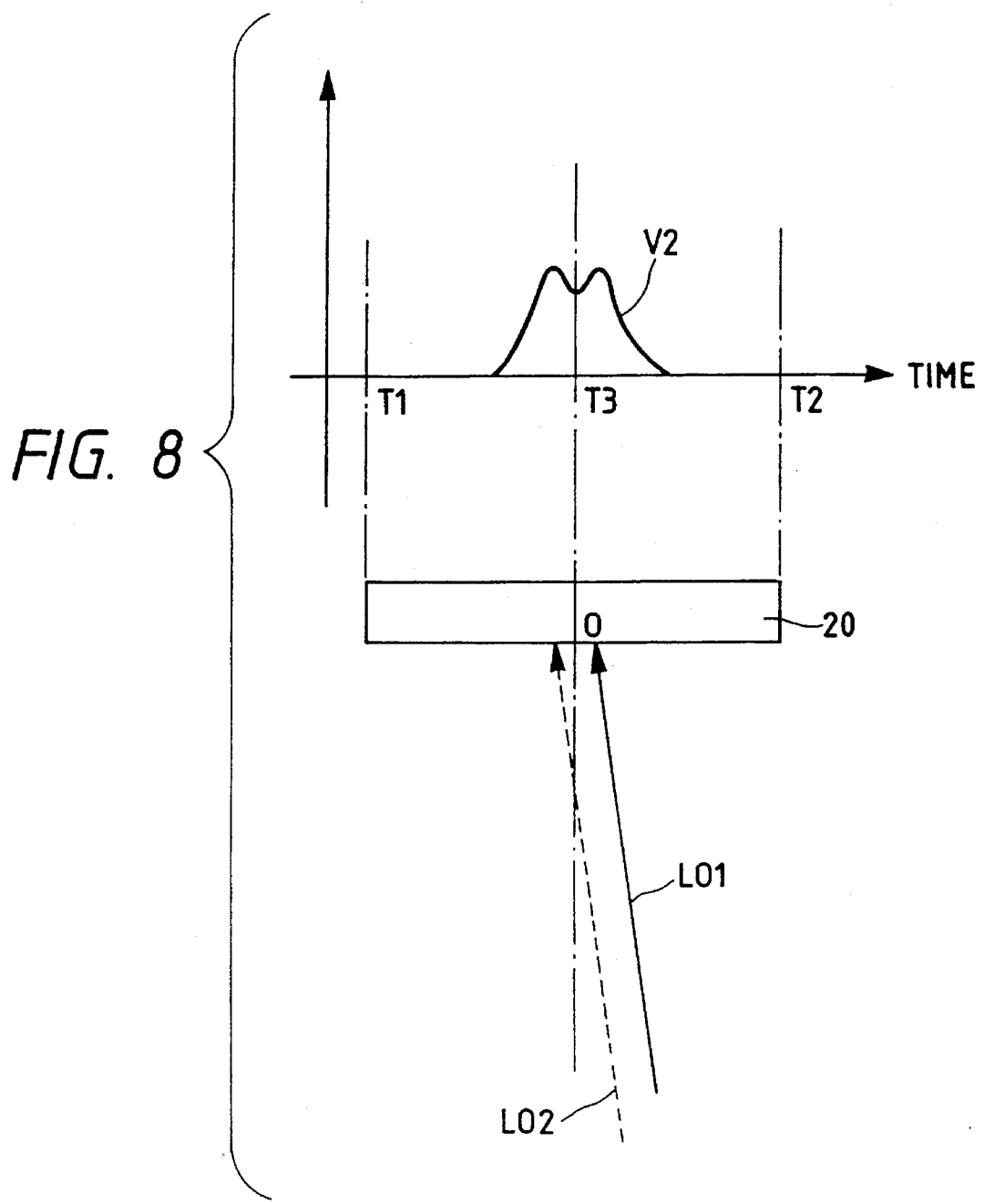
FIG. 8 is a diagram of the light receiving state of the first CCD and the state of a signal outputted from the first CCD when the in-focus state is detected on the basis of the output signal of the first CCD.

FIG. 8 shows the light receiving state of the first CCD 20 when the output from the differential amplifier circuit 43 has become substantially zero.

As shown in FIG. 8, the reflected beam of infrared light L01 and the reflected beam of infrared light L02 enter the light receiving surface of the first CCD 20 on the opposite sides of a point 0.

Accordingly, a signal V2 as if the positional relation between the surface 23 of the object S to be inspected and the objective lens 2 were the in-focus state is outputted from the first CCD 20, and the CPU 30 judges that the positional relation between the objective lens 2 and the object S to be inspected is the in-focus state (step 7).

After a predetermined time has passed, the focusing operation is started again.

When the adjustment of the light source (step 2) is completed in the same manner as described above, the CPU 30 judges whether the peak level of the signal outputted from the second CCD 22 is higher than a predetermined lower limit level (step 3).

Figure 9:
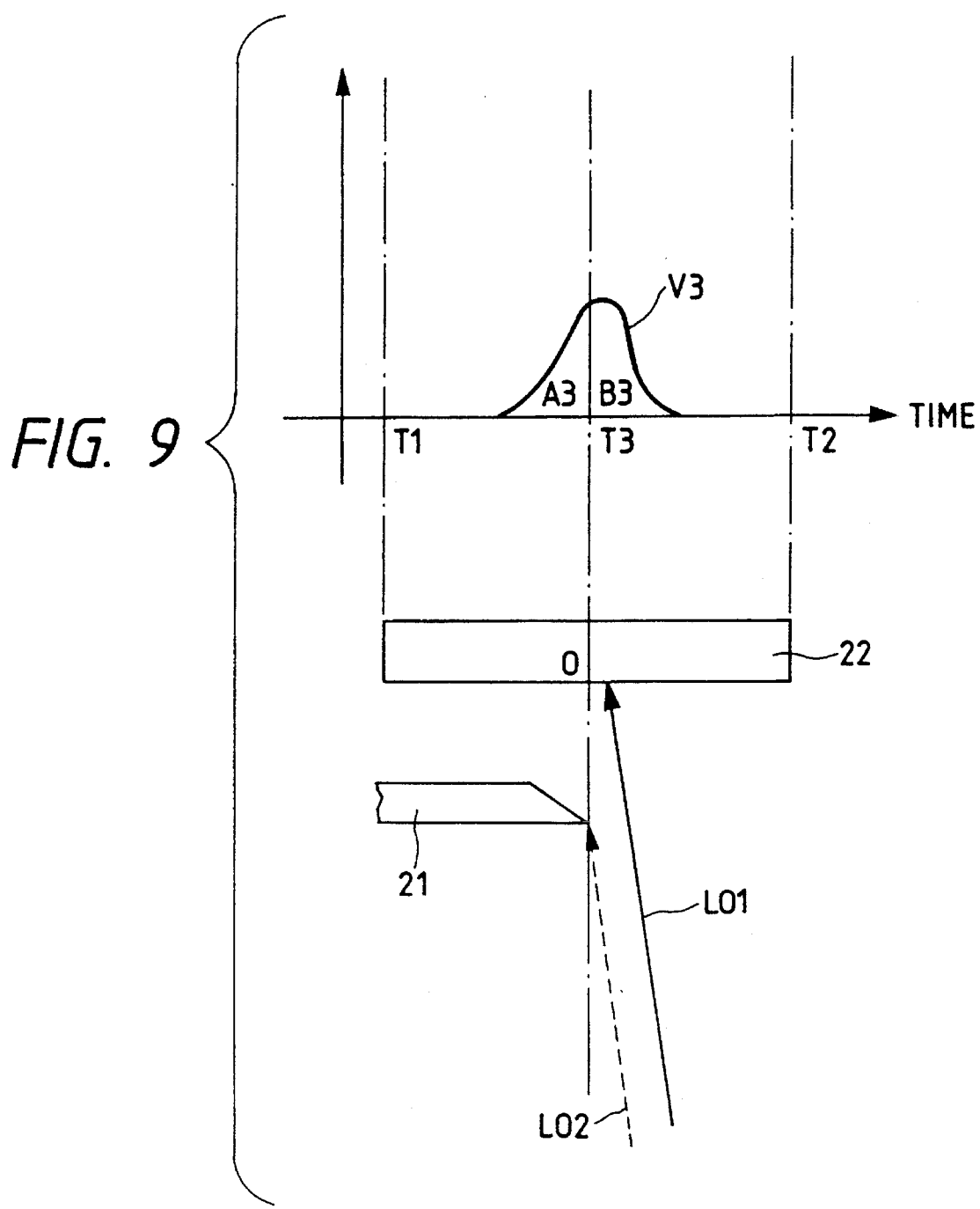
FIG. 9 is a diagram of the light receiving state of the second CCD and the state of a signal outputted from the second CCD when the in-focus state is detected on the basis of the output signal of the first CCD.

When as shown in FIG. 8, the reflected beams of infrared light L01 and L02 enter the first CCD 20, the light receiving state of the second CCD 22 becomes such as shown in FIG. 9. That is, the reflected beam of infrared light L01 from the surface 23 of the object S to be inspected enters the light receiving surface of the second CCD 22. Accordingly, the peak level of the signal from the second CCD 22 is higher than the predetermined lower limit level and therefore, the CPU 30 connects the changeover switch 36 to the second CCD 22 (step 5).

After it has selected the second CCD 22, the CPU 30 effects the control of the gain of the PGA circuit 37 on the basis of the signal outputted from the second CCD in the same manner as described above (step 6).

As shown in FIG. 9, the reflected beam of infrared light L01 from the surface 23 of the object S to be inspected impinges on a location deviating a little from the point 0 on the light receiving surface of the second CCD 22, and the reflected beam of infrared light L02 from the back 24 of the object S to be inspected is intercepted by the light intercepting plate 21.

An output signal V3 is outputted from the second CCD 22.

The integral value A3 of the output signal V3 from time T1 till time T3 is outputted from the sampling and holding circuit 41, and the integral value B3 of the output signal V1 from time T3 till time T2 is outputted from the differential amplifier circuit 42. A signal (A3–B3) is outputted from the differential amplifier circuit 43 to the CPU 30.

Since at this time, the integral value B3 is slightly greater than the integral value A3, the CPU 30 lowers the stage 25 to thereby slightly space the surface 23 of the object S to be inspected apart from the objective lens 2.

This operation is repeated until the output from the differential amplifier circuit 43 becomes substantially zero.

Figure 10:
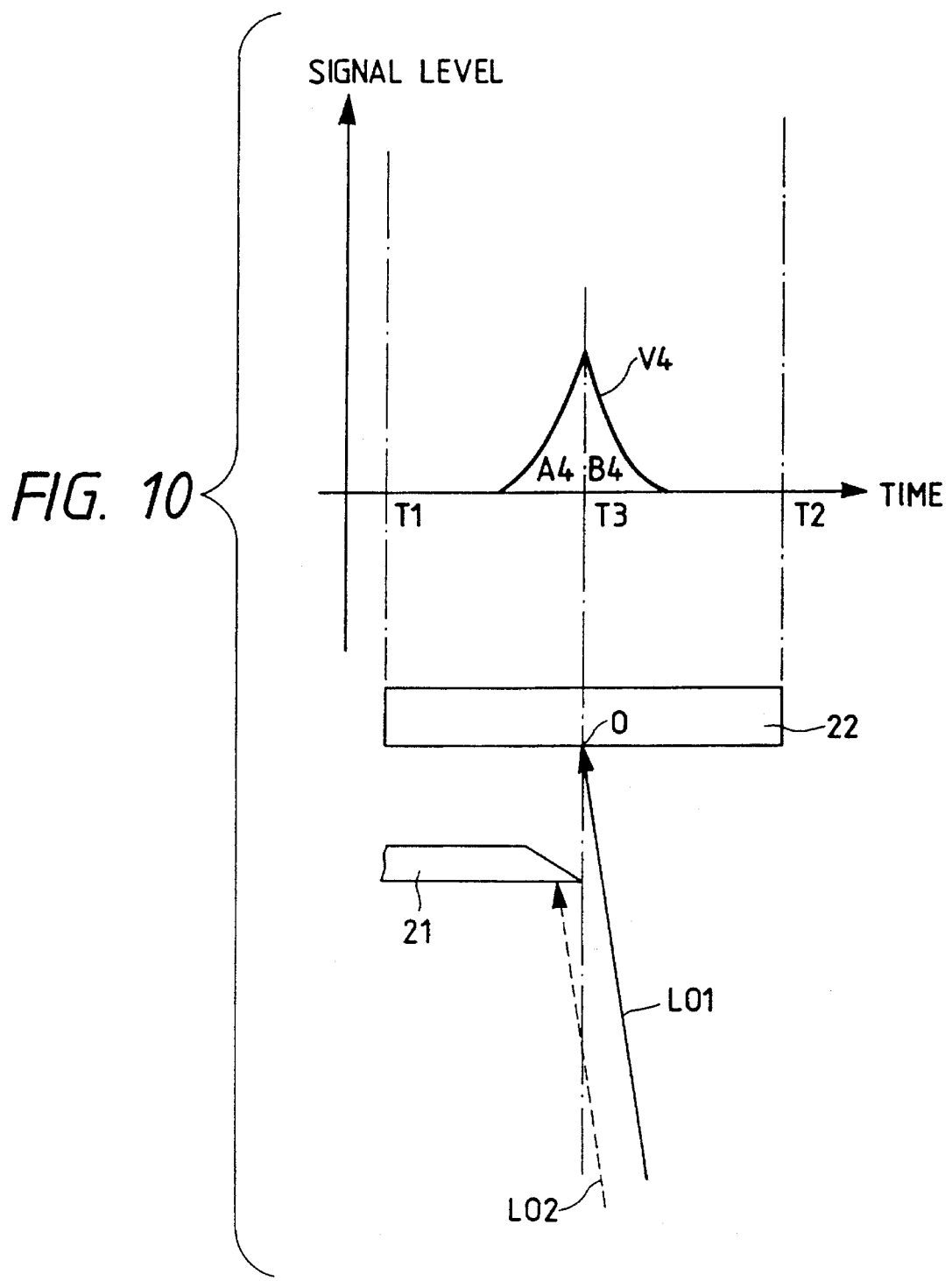
FIG. 10 is a diagram of the light receiving state of the second CCD and the state of a signal outputted from the second CCD when the in-focus state is detected on the basis of the output signal of the second CCD.
Figure 11:
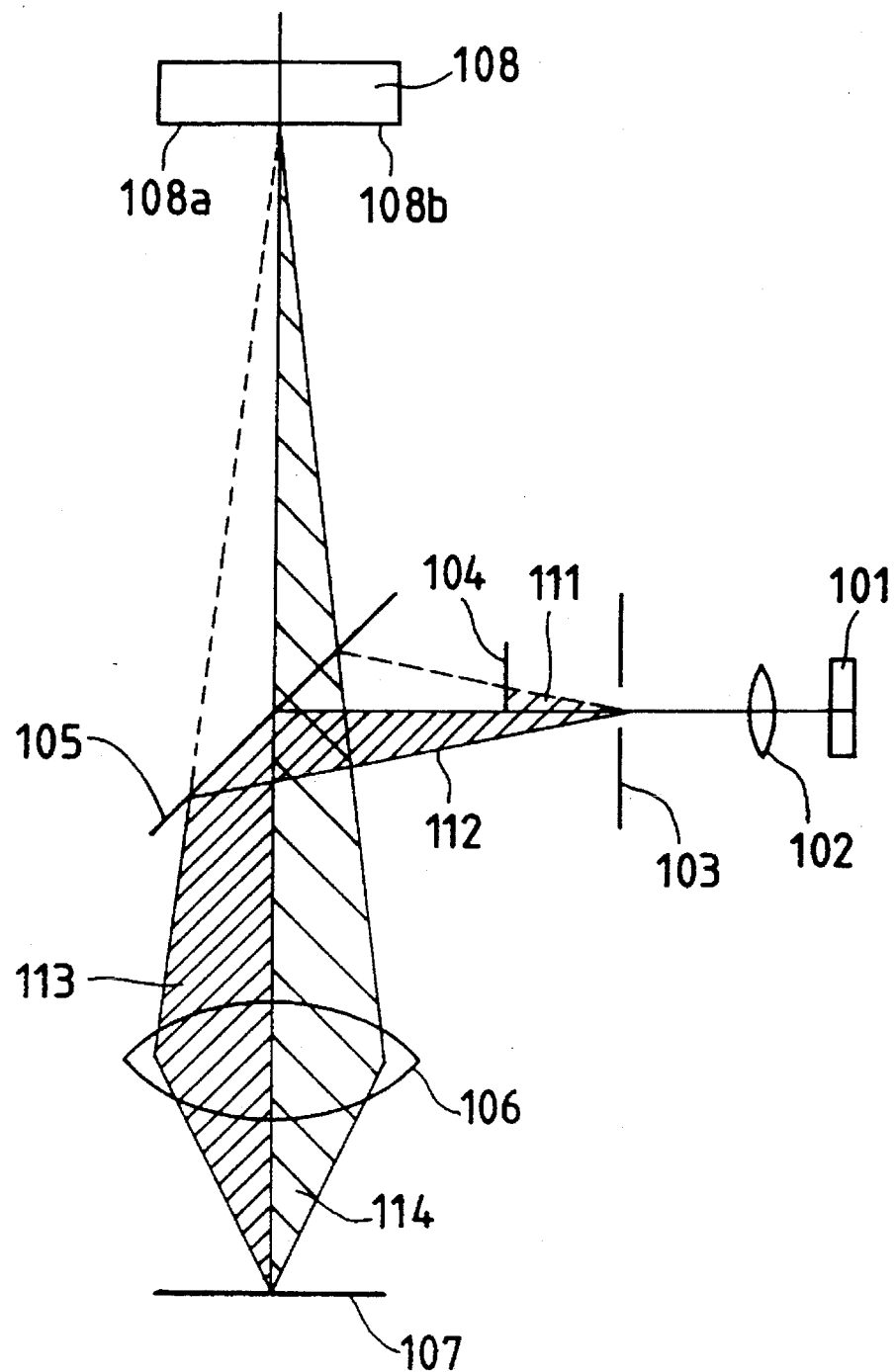
FIG. 11 is a diagram of the optical construction of a focusing apparatus according to the prior art.

FIG. 10 shows the light receiving state of the second CCD 22 when the output from the differential amplifier circuit 43 has become substantially zero.

As shown in FIG. 10, the reflected beam of infrared light L02 from the back 24 of the object S to be inspected is intercepted by the light intercepting plate 21, and the reflected beam of infrared light L01 from the surface 23 of the object S to be inspected impinges on the point 0 on the light receiving surface of the second CCD 22.

Referring to FIG. 10, a signal V4 is outputted from the second CCD 22. The integral value A4 of the output signal V4 from time T1 till time T3 is outputted from the sampling and holding circuit 41, and the integral value B4 of the output signal V4 from time T3 till time T2 is outputted from the differential amplifier circuit 42. A signal (A4–B4) is outputted from the differential amplifier circuit 43 to the CPU 30.

The CPU 30 determines that the signal (A4–B4) from the differential amplifier circuit 43 is substantially zero, and determines that the positional relation between the surface 23 of the object S to be inspected and the objective lens 2 is the in-focus state (step 7).

Thus, when the focusing operation is performed on the basis of the output of the second CCD, an accurate in-focus state can be obtained without being affected by the reflected light from the back 24 of the object S to be inspected.

The above embodiment has been described with respect to a case where the focusing operation is performed on the basis of the output signal of the first CCD 20 and thereafter the focusing operation is performed on the basis of the output signal of the second CCD 22. The focusing operation is performed by the second CCD 22 alone in a case where the relationship between first objective lens 2 and the surface to be inspected is nearer than the in-focus position and the re-imaged position of the reflected beam of light L01 from the surface 23 of the object S to be inspected is rearward of the light receiving surface of the second CCD 22 (the rear focus state) at a point in time when the detection of the focus position has been started, that is, a case where a signal of sufficient level is obtained from the second CCD 22.

Also, in the above-described embodiment, when the level of the signal outputted from the second CCD 22 is extremely low (when in the front focus state), a state in which the reflected beam of infrared light L01 and the reflected beam of infrared light L02 enter the light receiving surface of the first CCD 20 on opposite sides of the point 0 thereon (a tentative in-focus state (the rear focus state)) is brought about on the basis of the signal outputted from the first CCD 20. Thereafter, a state in which the reflected beam of infrared light L01 from the surface 23 of the object S to be inspected enters the point 0 on the light receiving surface of the CCD (a true in-focus state) is detected and thus, the stage 25 is first elevated, whereafter it is lowered and therefore, throughput is reduced.

So, if the predetermined lower limit level (see step 3) compared with the peak level of the output signal of the second CCD 22 is preset to a low level, the operation changes over to the focusing operation based on the second CCD 22 before the true in-focus state is passed. Therefore, the focus position can be detected by only the elevation of the stage 25.

While in the above-described embodiment, CCD line sensors are best suited as the light receiving members, position sensors can also be used. Also, two-dimensional CCDs can be used to provide the function of detecting the inclination of the surface to be inspected.

It is also possible to use two-division sensors as the light receiving members, but in such case, it will be necessary to position the first light receiving element and the second light receiving element accurately. In contrast, CCD line sensors can set a position electrically corresponding to the dividing line of the two-division sensor and therefore have the advantage that the installation of the light receiving elements is easy.

In the description of FIG. 1, it has been described that the position of the light intercepting plate 21 in the direction of the optical axis A×3 is between the plane conjugate with the surface 23 of the object S to be inspected and the plane conjugate with the back 24 of the object S to be inspected, but the distance between these two conjugate planes varies depending on the thickness and refractive index of the object to be inspected. Consequently, in order to cope with a variety of objects to be inspected, it is preferable that the light intercepting plate 21 be near the second CCD 22.

However, the fact that the light intercepting plate 21 is near the second CCD 22 is equivalent to the fact that the light receiving range of the second CCD 22 is narrow. Therefore, when the refractive index and thickness of the object to be inspected are constant and the plane conjugate with the surface of the object to be inspected and the plane conjugate with the back of the object to be inspected are known, the distance between the second CCD 22 and the light intercepting plate 21 can be made great to thereby make the light receiving range of the second CCD 22 great without reducing the focusing accuracy. It is also effective to movably install the light intercepting plate 21 depending on the thickness and refractive index of the object to be inspected and adjust the position thereof.

What is claimed is:

1. A method of focusing on an object to be inspected in an imaging optical system, including the steps of:

passing a beam of light from a light source through one half of a pupil of the imaging optical system and passing a reflected beam of light from the object to be inspected through the other half of the pupil of the imaging optical system;

dividing the reflected beam of light from the object to be inspected into a first reflected beam of light and a second reflected beam of light;

intercepting part of the second reflected beam of light; and moving the object to be inspected and the imaging optical system relative to each other on the basis of the first reflected beam of light, and thereafter moving the object to be inspected and the imaging optical system relative to each other on the basis of the intercepted part of the second reflected beam of light to effect focusing.

2. A focusing method according to claim 1, wherein said intercepting step comprises disposing a light intercepting member between a plane optically conjugate with the surface of the object to be inspected and a plane conjugate with the back of the object to be inspected, with respect to the imaging optical system.

3. A method of focusing on an object to be inspected in an imaging optical system, including the steps of:

passing a beam of light from a light source through one half of a pupil of the imaging optical system and passing a reflected beam of light from the object to be inspected through the other half of the pupil of the imaging optical system;

dividing the reflected beam of light from the object to be inspected into a first reflected beam of light and a second reflected beam of light;

intercepting part of the second reflected beam of light;

receiving the first reflected beam of light and outputting a signal conforming to the quantity of received light;

receiving the intercepted part of the second reflected beam of light via a light receiving member;

comparing the peak level of the signal conforming to the quantity of received light with a predetermined level;

moving the object to be inspected and the imaging optical system relative to each other on the basis of the output of the light receiving member when the peak level of the signal conforming to the quantity of received light is higher than the predetermined level, to effect focusing; and moving the object to be inspected and the imaging optical system relative to each other on the basis of the signal conforming to the quantity of received light, and thereafter moving the object to be inspected and the imaging optical system relative to each other on the basis of the output of the light receiving member when the peak level of the signal outputted from the light receiving member is lower than the predetermined level, to effect focusing.

4. A focusing method according to claim 3, wherein said intercepting step comprises disposing a light intercepting member between the object to be inspected and a plane conjugate with a back of the object to be inspected, with respect to the imaging optical system.

5. A focusing method according to claim 3, wherein the first light receiving member and the second light receiving member are CCDs.

6. A focusing apparatus for focusing on an object to be inspected in an imaging optical system including:

an optical member to pass a beam of light from a light source through one half of a pupil of the imaging optical system and passing a reflected beam of light from the object to be inspected through the other half of the pupil of the imaging optical system;

light dividing means for dividing the reflected beam of light from the object to be inspected into a first reflected beam of light and a second reflected beam of light;

a light intercepting member to intercept part of the second reflected beam of light;

a first light receiving member to receive the first reflected beam of light;

a second light receiving member to receive the intercepted part of the second reflected beam of light which has passed through said light intercepting member; and control means for moving the object to be inspected and the imaging optical system relative to each other on the basis of the output of said first light receiving member and the output of said second light receiving member to effect focusing, said control means moving the object to be inspected and the imaging optical system relative to each other on the basis of the output of said first light receiving member and thereafter moving the object to be inspected and the imaging optical system relative to each other on the basis of the output of said second light receiving member to effect focusing.

7. A focusing apparatus according to claim 6, wherein said light intercepting member is disposed between a plane optically conjugate with a surface of the object to be inspected and a plane conjugate with a back of the object to be inspected, with respect to the imaging optical system.

8. A focusing apparatus according to claim 6, wherein said first light receiving member and said second light receiving member are CCDs.

9. A focusing apparatus for focusing on an object to be inspected in an imaging optical system including:

an optical member to pass a beam of light from a light source through one half of a pupil of the imaging optical system and passing a reflected beam of light from the object to be inspected through the other half of the pupil of the imaging optical system;

light dividing means for dividing the reflected beam of light from the object to be inspected into a first reflected beam of light and a second reflected beam of light;

a light intercepting member to intercept part of the second reflected beam of light;

a first light receiving member to receive the first reflected beam of light;

a second light receiving member to receive the intercepted part of the second reflected beam of light which has passed through said light intercepting member; and control means for moving the object to be inspected and the imaging optical system relative to each other on the basis of the output of said first light receiving member and the output of said second light receiving member to effect focusing, said control means comparing the peak level of the output of said second light receiving member with a predetermined level, moving the object to be inspected and the imaging optical system relative to each other on the basis of the output of said second light receiving member when the peak level of the output of said second light receiving member is higher than the predetermined level, to effect focusing, and moving the object to be inspected and the imaging optical system relative to each other on the basis of the output of said first light receiving member, and thereafter moving the object to be inspected and the imaging optical system relative to each other on the basis of the output of said second light receiving member when the peak level of the output of said second light receiving member is lower than said predetermined level, to effect focusing.

10. A microscope including:

an objective optical system to image a beam of light from a light source on a surface of an object to be inspected, said objective optical system having a pupil;

an optical member to pass the beam of light from the light source through one half of the pupil of said objective optical system and to pass a reflected beam of light from the object to be inspected through the other half of the pupil of said objective optical system;

light dividing means for dividing the reflected beam of light from the object to be inspected into a first reflected beam of light and a second reflected beam of light;

a light intercepting member to intercept part of the second reflected beam of light;

a first light receiving member to receive the first reflected beam of light;

a second light receiving member to receive the intercepted part of the second reflected beam of light which has passed through said light intercepting member; and control means for moving the object to be inspected and said objective optical system relative to each other on the basis of the output of said first light receiving member and the output of said second light receiving member to effect focusing, said control means moving the object to be inspected and said objective optical system relative to each other on the basis of the output of said first light receiving member, and thereafter moving the object to be inspected and said objective optical system relative to each other on the basis of the output of said second light receiving member.

11. A microscope according to claim 10, wherein said light intercepting member is disposed between a plane optically conjugate with a surface of the object to be inspected and a plane conjugate with a back of the object to be inspected with respect to said objective optical system.

12. A microscope according to claim 10, wherein said first light receiving member and said second light receiving member are CCDs.

13. A microscope including:

an objective optical system to image a beam of light from a light source on a surface of an object to be inspected, said objective optical system having a pupil;

an optical member to pass the beam of light from the light source through one half of the pupil of said objective optical system and to pass a reflected beam of light from the object to be inspected through the other half of the pupil of said objective optical system;

light dividing means for dividing the reflected beam of light from the object to be inspected into a first reflected beam of light and a second reflected beam of light;

a light intercepting member to intercept part of the second reflected beam of light;

a first light receiving member to receive the first reflected beam of light;

a second light receiving member to receive the intercepted part of the second reflected beam of light which has passed through said light intercepting member; and control means for moving the object to be inspected and said objective optical system relative to each other on the basis of the output of said first light receiving member and the output of said second light receiving member to effect focusing, said control means comparing the peak level of the output of said second light receiving member with a predetermined level, moving the object to be inspected and said objective optical system relative to each other on the basis of the output of said second light receiving member when the peak level of the output of said second light receiving member is higher than the predetermined level, to effect focusing, and moving the object to be inspected and said objective optical system relative to each other on the basis of the output of said first light receiving member, and thereafter moving the object to be inspected and said objective optical system relative to each other on the basis of the output of said second light receiving member when the peak level of the output of said second light receiving member is lower than the predetermined level, to thereby effect focusing.

14. A focusing apparatus for focusing in an imaging optical system on a first surface of a transparent substrate having first and second surfaces, comprising:

an applying system for applying a beam of light from a light source through the imaging optical system onto the substrate, said applying system including a first light intercepting member which causes a beam of light passing one area of a pupil of the imaging optical system which is divided by a plane including an optical axis of the imaging optical system, from among beams of light emitted from the light source, to be transmitted;

a light dividing member for dividing a beam of light reflected by the substrate and returned to the imaging optical system, into a first reflected beam of light and a second reflected beam of light;

a second light intercepting member for intercepting a portion of the second reflected beam of light from the second surface when focusing is performed in the imaging optical system on the first surface;

a first light receiving member for receiving the first reflected beam of light and producing first information regarding a position of the substrate in a direction of the optical axis of the imaging optical system;

a second light receiving member for receiving the second reflected beam of light through said second light intercepting member and producing second information regarding a position of the substrate in a direction of the optical axis of the imaging optical system; and control means for moving the substrate and the imaging optical system relative to each other in a direction of the optical axis of the imaging optical system based on the first and second information, to focus in the imaging optical system on the first surface of the substrate.

15. A focusing apparatus according to claim 14, wherein said second light intercepting member is arranged between a plane optically conjugate with the first surface and a plane optically conjugate with the second surface, with respect to the imaging optical system when focusing is performed in the imaging optical system on the first surface, and intercepts light passing one area in a plane perpendicular to the optical axis of the imaging optical system divided by a plane including the optical axis of the imaging optical system.

16. A method of focusing in an imaging optical system on a first surface of a transparent substrate having first and second surfaces, comprising the steps of:

applying light emitted from a light source and passing one area of a pupil of the imaging optical system divided by a plane including an optical axis of the imaging optical system, onto the substrate through the imaging optical system;

photoelectrically detecting a beam of light reflected by the substrate and returned to the imaging optical system to produce first information regarding a position of the substrate in a direction of the optical axis of the imaging optical system;

photoelectrically detecting a reflected beam of light from the substrate through a light intercepting member for intercepting a reflected light from the second surface of the substrate when focusing is performed in the imaging optical system on the first surface, and producing second information regarding a position of the substrate in a direction of the optical axis of the imaging optical system; and focusing in the imaging optical system onto the first surface of the substrate by relatively moving the substrate and the imaging optical system in a direction of the optical axis of the imaging optical system based on the first and second information.

17. A method according to claim 16, wherein the step of focusing in the imaging optical system onto the first surface includes the steps of:

comparing an intensity of a photoelectric signal when producing the second information with a predetermined intensity; and performing focusing by moving the substrate and the imaging optical system relative to each other based on the second information when the intensity of the photoelectric signal exceeds the predetermined intensity, and performing focusing by moving the substrate and the imaging optical system relative to each other based on the first information and thereafter by moving the substrate and the imaging optical system relative to each other based on the second information when the intensity of the photoelectric signal lowers the predetermined intensity.

\* \* \* \* \*